United States Patent [19]

Watanabe

[11] Patent Number: 4,689,528
[45] Date of Patent: Aug. 25, 1987

[54] PRINTER

[75] Inventor: Youichi Watanabe, Kawasaki, Japan

[73] Assignee: Canon Kabushiki Kaisha, Tokyo, Japan

[21] Appl. No.: 791,403

[22] Filed: Oct. 25, 1985

[30] Foreign Application Priority Data

Oct. 31, 1984 [JP] Japan ................................ 59-227957
Oct. 31, 1984 [JP] Japan ................................ 59-227958
Oct. 31, 1984 [JP] Japan ................................ 59-227959
Dec. 17, 1984 [JP] Japan ................................ 59-264570

[51] Int. Cl.$^4$ .......................................... G05B 11/18
[52] U.S. Cl. .................................. 318/594; 318/561; 318/602
[58] Field of Search .................... 318/594, 602, 561

[56] References Cited

U.S. PATENT DOCUMENTS

| 4,219,766 | 8/1980 | Lin ...................................... 318/594 |
| 4,259,626 | 3/1981 | Nomura et al. .................. 318/603 X |
| 4,473,786 | 9/1984 | Miyashita et al. .................. 318/602 |
| 4,558,265 | 12/1985 | Hayashida et al. ................. 318/602 |
| 4,558,965 | 12/1985 | Ueda et al. ...................... 400/144.2 |
| 4,574,227 | 3/1986 | Herder et al. ....................... 318/594 |
| 4,588,936 | 5/1986 | Itoh et al. ........................ 318/602 |
| 4,605,887 | 8/1986 | Boella et al. ....................... 318/594 |

Primary Examiner—Benjamin Dobeck
Attorney, Agent, or Firm—Fitzpatrick, Cella, Harper & Scinto

[57] ABSTRACT

A velocity of a motor which selects a type element of a type head or a motor which drives a carrier carrying the type head in a printer is controlled in accordance with a positional error which represent a distance from a present position to a target print position of the type head or the carrier. When the motor is stopped at a desired position, it is appropriately damped.

2 Claims, 4 Drawing Figures

1

PRINTER

BACKGROUND OF THE INVENTION

1. Field of the Invention

The present invention relates to a printer such as an electronic typewriter, and more particularly to servo control of the velocity of a motor which selects a type of a type head (type wheel) or moves a carrier carrying the type head.

2. Description of the Prior Art

A D.C. motor is usually used as a carrier motor (or a type selection motor in a daisy wheel type head) of a printer such as an electronic typewriter. A target velocity of the carrier (type wheel selection motor) is set to follow a root curve, that is, it is proportional to the square root of a distance (rotation angle) from a current position to a target print position of the carrier (motor), and the velocity of the carrier (motor) is controlled in accordance with that curve. However, means for moving the carrier (motor) to follow the target movement (rotation) velocity cannot fully compensate for a change of friction of a load (friction of the motor and moment of inertia of the type head). As a result, the time required to move (rotate) the carrier (motor) by a given distance (angle) is not uniform, and if deceleration is not sufficient, overshooting occurs for the target print position and the print quality is degraded.

SUMMARY OF THE INVENTION

It is an ojbect of the present invention to provide a printer which sets a servo gain of a motor for driving a driven unit of the printer in accordance with a positional error which represents a distance from a present position to a target position of the driven unit.

It is another object of the present invention to provide a printer which effectively damps a motor when the motor is to be stopped.

Other objects of the present invention will be apparent from the description of preferred embodiments of the present invention.

DESCRIPTION OF THE PREFERRED EMBODIMENTS

Figure 1:
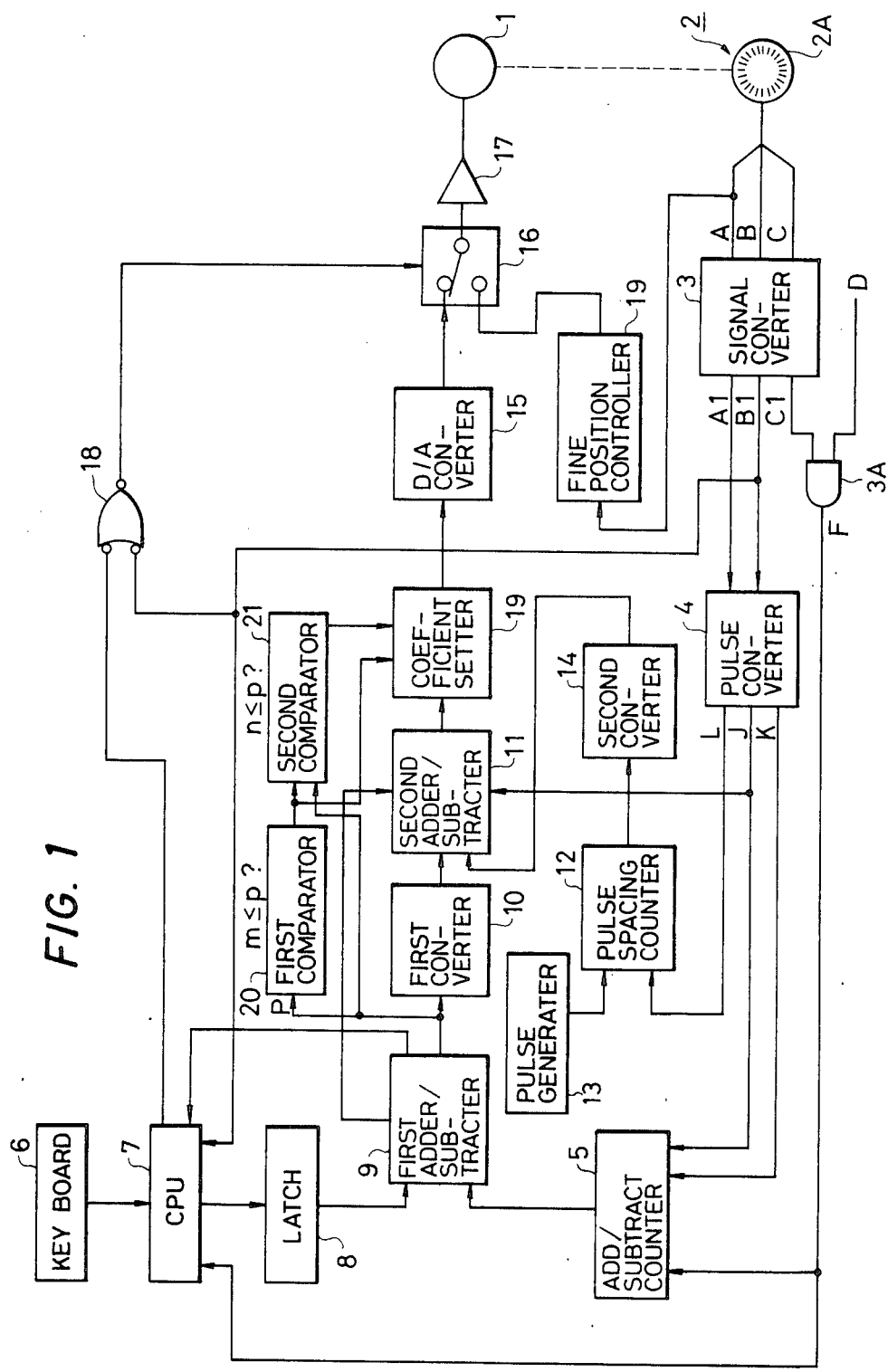
FIG. 1 is a block diagram of one embodiment of a velocity control unit for a motor used in a printer.

FIG. 1 shows a velocity control unit for a motor to move a carrier of a typewriter. While not shown, a print unit of the typewriter comprises a print head, a type wheel mounted on the print head and having types arranged on a circumference of the print head, and a carrier for moving the print head to a desired print position.

In FIG. 1, numeral 1 denotes a D.C. motor which moves the carrier and which is controlled by a drive current to be described later, numeral 2 denotes a photo-encoder for detecting a position and a velocity of the carrier motor 1, comprising a disk plate 2A coupled to a shaft of the motor 1, three light emitting diodes (LEDs) and three photosensors. As the disk plate 2A rotates, lights emitted from the light emitting diodes and transmitted through slits of the disk 2A are received by the photo-sensors and the photo-encoder 2 produces three output signals. The signals A and B are sine wave signals having a phase difference of 90 degrees in accordance with the number of slits, and the signal C is a reference position signal which indicates a reference position of the motor 1.

The signals A, B and C from the photo-encoder 2 are supplied to a signal converter 3 which converts them to binary digital signals A1, B1 and C1, respectively, A1 and B1 of which are then supplied to a pulse conversion circuit 4. When the signal A1 advances by 90 degrees from the signal B1, the pulse conversion circuit 4 produces a "1" as a rotating direction signal J, and when the signal B1 advances by 90 degress from the signal A1, it produces a "0" as the rotating-direction signal J, which thereby indicates the rotating direction of the motor 1. The pulse conversion circuit 4 also produces a position pulse signal K in response to a fall or rise of the signal A1 when the signal B1 is "0", and an edge signal L which is produced in response to falls or rises of the signals A1 and B1.

The signal C1 from the signal converter 3 is supplied to one input terminal of an AND circuit 3A. A signal D from a sensor (not shown) which detects when the carrier reaches a home position in an initialization operation is supplied to the other input terminal of the AND circuit 3A. Only when the signals C1 and D are supplied, is an output signal F produced and supplied to an add/subtract counter 5 which indicates the present position of the carrier. The rotation direction signal J and the position pulse signal K from the pulse conversion circuit 4 are also supplied to the add/subtract counter 5.

When the output signal F from the AND circuit 3A is supplied, the add/subtract counter 5 is reset. Thereafter, the add/subtract counter 5 is counted up or down each time the position pulse K is supplied, depending on whether "0" or "1" is produced a the rotation-direction signal J from the pulse conversion circuit 4. Accordingly, the output of the add/subtract counter 5 always indicates the current position of the carrier.

On the other hand, print information which is entered from a keyboard 6 which is input means for inputting character information to be printed, is sent to a central processing unit (CPU) 7. The CPU 7 also receives the output signal F from the AND circuit 3A and it is initialized thereby. The CPU 7 determines a target print position based on the keyed-in information from the keyboard 6 and the operation result is temporarily stored in a latch 8.

A target print position signal from the latch 8 and a carrier current position signal from the add/subtract counter 5 which indicates the current position of the carrier are supplied to a first adder/subtractor 9, which calculates a direction and distance of movement from the current carrier position to the target print position based on the two input signals to produce a position error. The direction of movement of the carrier is represented by a sign "+" or "−" depending on forward or backward direction, and the distance of movement is represented by an integer.

For example, assuming that the current position of the carrier is "24" represented as a decimal number and the target print position by the carrier is "48", then "48" is stored in the latch 8 as the target print position data, and this data and "24" which is the current position data outputted from the add/subtract counter 5 are supplied to the first adder/subtractor 9.

The first adder/subtractor 9 calculates (target print position data) - (current position data) that is, $$48 - 24 = +24$$

As a result, the first adder/subtractor 9 produces the position error of "+24" and an absolute value "24" thereof is supplied to a first converter 10 and a first comparator 20. The sign "+" which indicates the direction of movement of the carrier is supplied to a second adder/subtractor 11. The position error "+24" including the direction of movement is supplied to the CPU 7.

The first converter 10 is in a form of read-only memory (ROM) and produces a target velocity of the carrier which corresponds to the absolute value of the input position error data. The target velocity of the carrier is proportional to the square root of the position error and it is preset to follow a root curve. Thus, $$V_D = K_1 \sqrt{P}$$

where P is the absolute value of the position error, $V_D$ is the target velocity and $K_1$ is a constant which depends on a print speed. The target velocity of the carrier outputted from the first converter 10 is supplied to the second adder/subtractor 11.

On the other hand, the edge signal L from the pulse conversion circuit 4 is supplied to a pulse interval or spacing counter 12, which also receives a pulse signal of a predetermined period from a pulse generator 13. The pulse spacing counter 12 measures a pulse interval or spacing of the edge signal L from the pulse conversion circuit 4 and supplies it to a second converter 14 which is in a form of read-only memory (ROM). Since the pulse interval of the edge signal L from the pulse conversion circuit 4 is proportional to a reciprocal of the carrier velocity, the output of the second converter 14 indicates an absolute value of the carrier velocity. Thus, $$V_r = K_2 \times \frac{1}{T}$$

where $V_r$ is the carrier velocity, T is the output of the pulse interval or spacing counter 12 and $K_2$ is a constant.

The output signal from the second converter 14 which indicates the carrier velocity and the rotation direction signal J from the pulse conversion circuit 4 which indicates the direction of movement of the carrier are supplied to the second adder/subtractor 11.

The second adder/subtractor 11 performs the following operation based on the input signals. For example, assuming that the first converter 10 produces "16" as the absolute value of the target carrier velocity in response to the absolute value "24" of the position error "+24" from the first adder/subtractor 9, the second adder/subtractor 12 receives "+16" as the target carrier velocity including the direction of movement "+" from the first adder/subtractor 9 which indicates the direction of movement of the position error data "+24".

On the other hand, the second converter 14 produces "10" as the absolute value of the carrier velocity. If the signal J indicating the direction of movement from the pulse conversion circuit 4 is "+", the second adder/subtractor 11 supplies $$(+16) - (+10) = +6$$

to a coefficient setter 19 as a velocity error including the direction of movement of the carrier. Output signals from the first comparator 20 and a second comparator 21 are also supplied to the coefficient setter 19.

The first comparator 20 receives the absolute value P of the position error, that is, "24" in the present example, from the first adder/subtractor 9 and it is compared with an experimentarily determined reference m, for example, m=25. Since the input "24" is smaller than the reference m, a logical signal "0" is produced and it is supplied to the second comparator 21, which also receives the absolute value "24" of the position error data from the first adder/subtractor 9, and it is compared with an experimentarily determined reference n, for example, n=4. Since the input "24" is larger than the reference n, a logical "1" signal is produced. Accordingly, the coefficient setter 19 receives the logical "0" signal from the first comparator 20 and the logical "1" signal from the second comparator 21. The reference m is larger than the reference n and both references may be arbitrarily selected.

The coefficient setter 19 determines a multiplier q for the velocity error ("+6" in the present example) supplied from the second adder/subtractor 11 based on the logical levels of the first comparator 20 and the second comparator 21. The multiplier q may be determined in the following manner in accordance with the outputs of the first comparator 20 and the second comparator 21.

TABLE 1

| Output of First Comparator | Output of Second Comparator | q |
|---|---|---|
| 0 | 0 | 1 |
| 0 | 1 | 2 |
| 1 | 0 | 4 |
| 1 | 1 | 4 |

The absolute value of the velocity error is multiplied by a multiplier to the velocity error shown in Table 2 in accordance with the absolute value of the position error, and a product is outputted from the coefficient setter 19.

TABLE 2

| Position Error | Multiplier to Velocity Error |
|---|---|
| P < 4 | x1 |
| 4 ≦ P < 24 | x2 |
| 24 ≦ P | x4 |

In the present example, the input from the first comparator 20 is "0" and the input from the second comparator 21 is "1". Accordingly, the multiplier to the velocity error "+6" is "×2" and the coefficient setter 19 carries out the following operation.

$$+6 \times 2 = +12$$

The operation result is supplied to a D/A converter 15, which produces an analog signal of a motor drive current including a polarity of the motor 1, that is, the rotation direction of the motor 1, from the input digital signal including the direction of movement of the carrier. The analog signal is supplied through a switch 16 to a motor drive amplifier 17 where it is amplified to drive the motor 1.

As the motor 1 is driven, the carriage is moved in the selected direction at the selected speed to the next print position.

Numeral 18 denotes a gate circuit which receives the output signal B1 from the signal converter 3 and the signal from the CPU 7 and supplies the output signal thereof to the switch 16, and numeral 19 denotes a fine position control circuit for controlling fine position of the carrier. It receives the signal A from the photoencoder 2 and supplies the output thereof to the switch 16.

In the present embodiment, the gain of the position servo is changed in accordance with the position error. When the absolute value P of the position error is $P \geq 24$, the gain is four times as high as that when $P < 4$. Accordingly, the tracking capability to the target carrier velocity is high and the operation is hardly sensitive to the change of friction of the load. The servo gain is set smaller when the absolute value P of the position error is small in order to prevent the oscillation of the carrier near the target position.

In accordance with the present embodiment, the gain of the velocity servo control is set stepwise in accordance with the absolute value of the position error which represents the distance from the current position to the target position of the carrier. Accordingly, the influence by the change of load of the carrier is small and the print quality is improved.

Another embodiment of the present invention is explained with reference to FIGS. 2 to 4.

Figure 2:
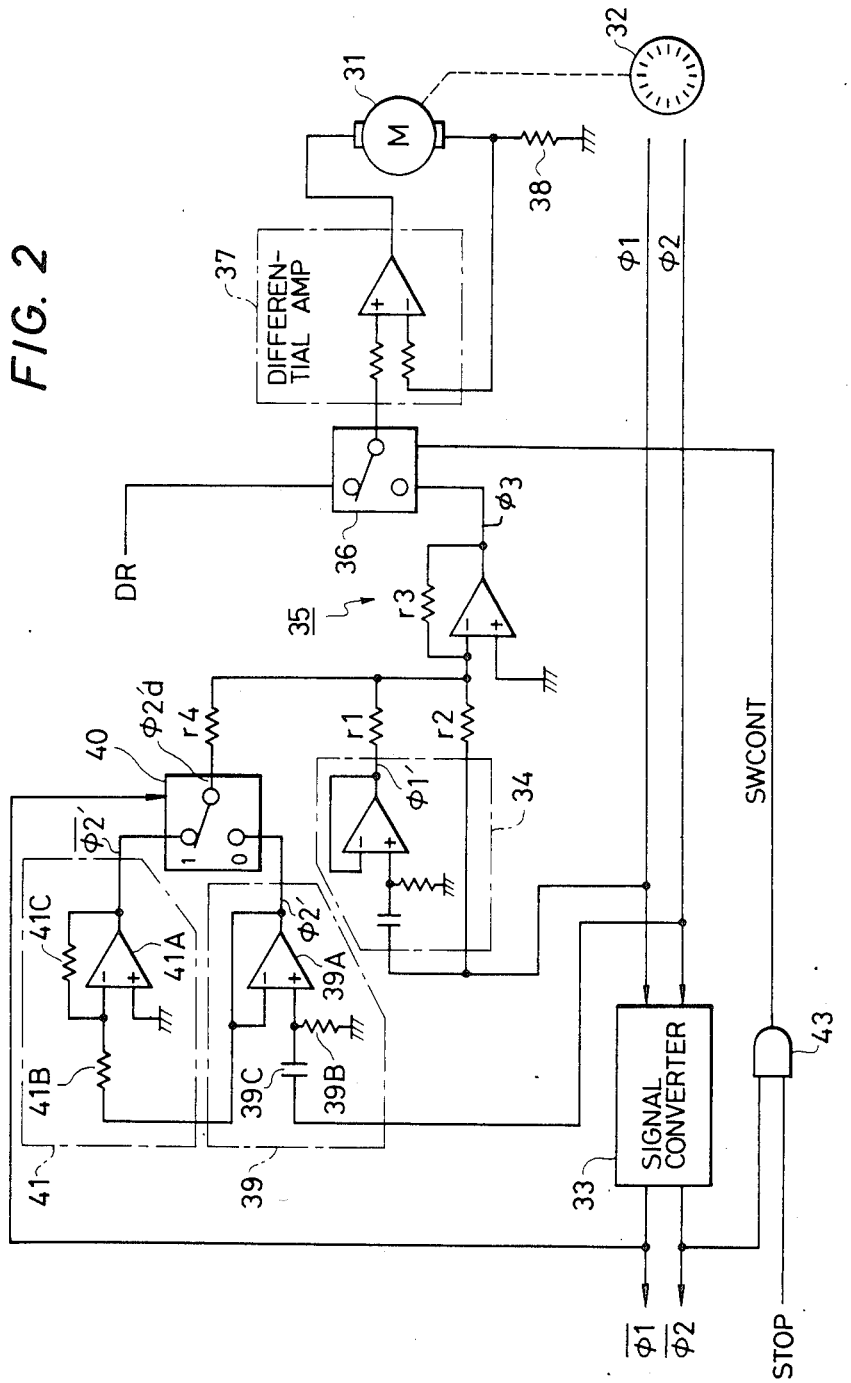
FIG. 2 is a block diagram of another embodiment of the velocity control unit for the motor used in the printer.

FIG. 2 shows a velocity control unit for a motor which drives a carrier of a typewriter. Numeral 31 denotes a D.C. motor which may intermittently drive a carrier carrying a print head, and numeral 32 denotes a rotary encoder. When the motor 31 rotates at a constant speed in a right direction, output signals $\phi 1$ and $\phi 2$ of the rotary encoder 32 are sine wave signals having a phase difference of 90 degrees from each other, as shown in FIG. 3. When the motor 31 rotates leftward, the phase relationship between the output signals $\phi 1$ and $\phi 2$ of the rotary encoder 32 is reversed.

A signal converter 33 converts the analog output signals $\phi 1$ and $\phi 2$ from the rotary encoder 32 to digital output signals $\phi 1$ and $\phi 2$, which are used by a circuit (not shown) to detect the position of the motor 31 and set the rotation speed and direction of the motor 31.

A differentiator 34 differentiates the output signal $\phi 1$ supplied from the rotary encoder 32 and supplies an output $\phi 1'$ which is advanced 90°, to an adder 35. An output $\phi 3$ of the adder 35 is a sum of a product of the absolute value of the output signal $\phi 1$ from the rotary encoder 32 and a gain (r3/r2), a product of the absolute value of the output signal $\phi 1'$ from the differentiator 34 and a gain (r3/r1), and a product of an absolute value of an output signal from a second differentiator 39 or an inverter 41 and a gain (r3/r4). r1-r4 are resistors. Numeral 36 denotes a switch which is switched by a switch control signal SWCONT supplied from an AND gate 43 when logical values of a stop signal STOP to stop the motor 1 and the output signal $\phi 2$ of the signal converter 33 are both "1". When the motor is to be driven, the switch 36 passes a drive signal DR to an amplifier 37.

Figure 3:
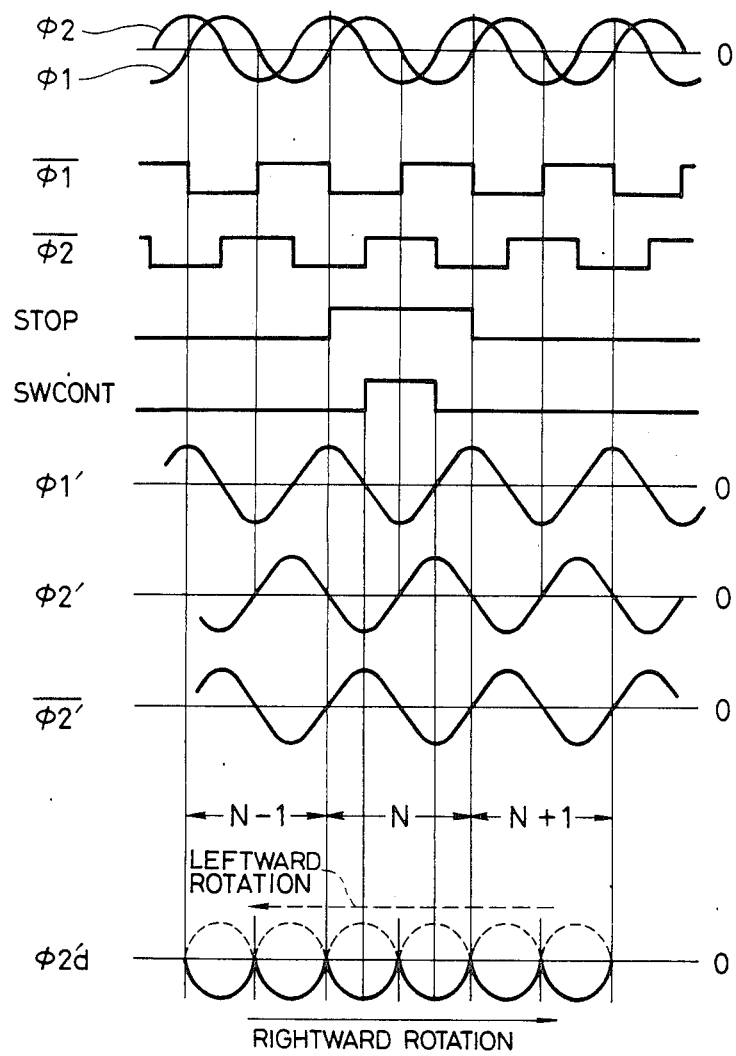
FIG. 3 shows a timing chart for FIG. 2.

Waveforms when the motor 1 is rotated at a constant speed are shown in FIG. 3, where N is the target print position.

The circuit of block diagram of FIG. 2 finely controls the position of the motor 31 at the target print position, and damps the rotation speed.

The output signal of the switch 36 is supplied to a differential amplifier 37, to which a target current of the D.C. motor 31 is inputted. A current sensing resistor 38 feeds a magnitude and a direction of current flowing in the motor 31 back to the input of the differential amplifier 37. Numeral 39 denotes a second differentiator which comprises an operational amplifier 39A, a resistor 39B and a capacitor 39C and which differentiates the output signal $\overline{\phi 2}$ of the rotary encoder 32. A signal $\phi 2'$ differentiated by the second differentiator 39 is supplied to one of input terminals of a switch 40 and also to an inverter 41 which comprises an operational amplifier 41A and resistors 41B and 41C. An inverted output signal $\overline{\phi 2'}$ from the inverter 41 is sent to the other input terminal of the switch 40. The switching of the switch 40 is controlled by the logical level of the output signal $\overline{\phi 1}$ of from the signal converter 33.

Waveforms in this arrangement are shown in FIG. 3. It shows a time chart when the motor 31 is rotated at the constant speed. The polarities of the selected output signal $\phi 2'$d from the switch 40 are reversed depending on rightward rotation or leftward rotation of the motor 31.

Figure 4:
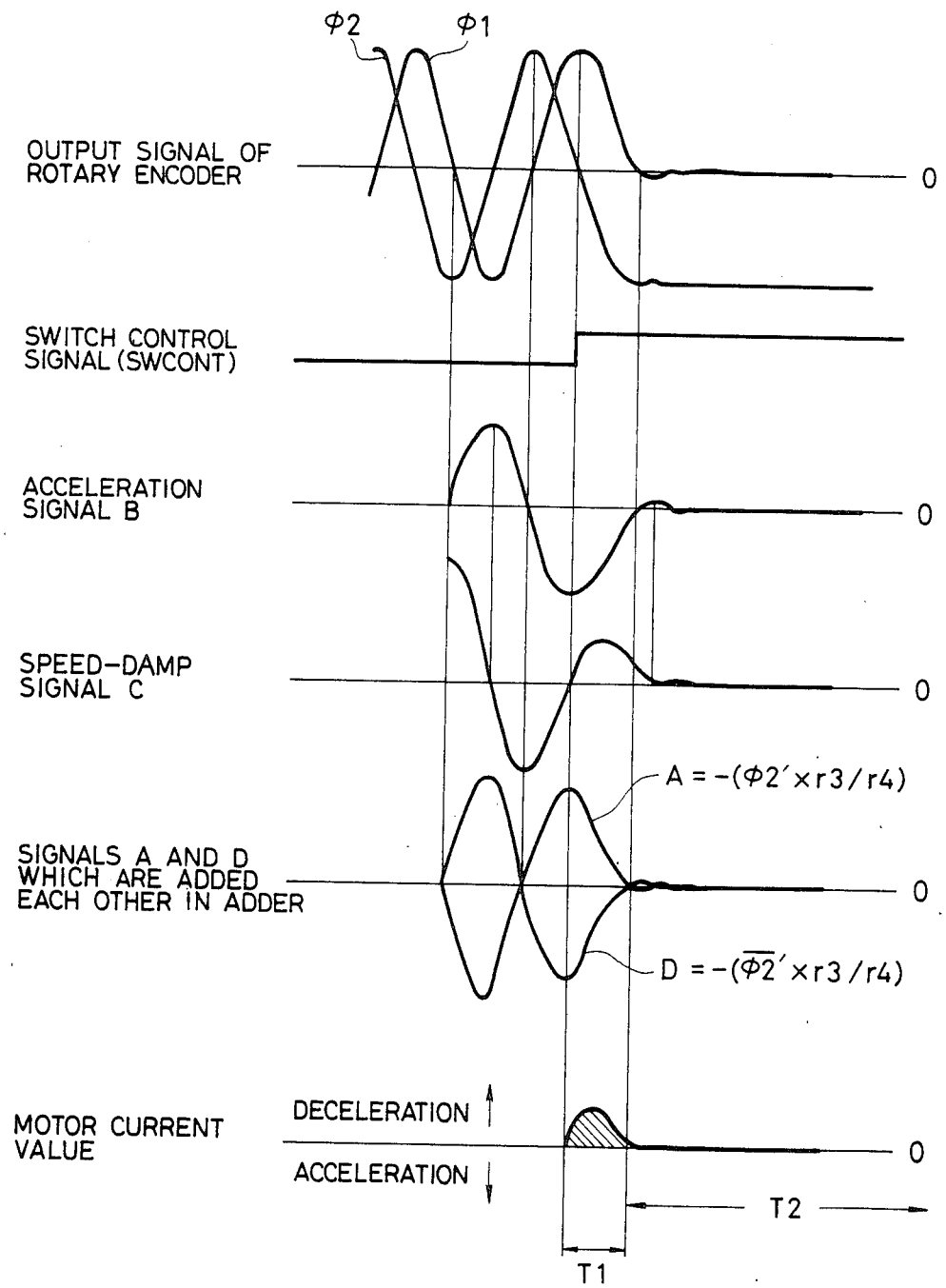
FIG. 4 shows a timing chart for damping control.

FIG. 4 shows a damping waveform and a current waveform to the motor 31 when the motor 31 is rightwardly rotated and then stopped. Immediately after the switch control signal SWCONT supplied from the AND gate 43 has risen from logical "0" to logical "1", the output signal $\overline{\phi 1}$ from the signal converter 33 is "0", and the contact of the switch 40 shown in FIG. 2 is at the opposite position to that shown in FIG. 2, that is, to receive the output signal $\phi 2'$ of the second differentiator 39.

Accordingly, a signal A shown in FIG. 4 which is outputted from the switch 40 and functions to decelerate the motor 31 in the adder 35 is represented by $$A = -(\phi 2' \times r3/r4)$$

where r3 and r4 are resistances of the resistors r3 and r4 connected to the adder 35.

During a period T1, the sum output from the adder 35 is a sum of the signal A, the signal B which is supplied from the rotary encoder 32 and functions to accelerate the motor 31 in the adder 35, and the signal C which is supplied from the differentiator 34 and functions to decelerate the motor 31 in the adder 35. However, since the signal B is cancelled by the deceleration component of the signal A, the deceleration current is outputted as the target current for the motor 31, as shown in FIG. 4.

During a period T2, the contact of the switch 40 is at the position shown in FIG. 2, and the output signal $\phi 2'$ from the inverter 41 is received by the switch 40 and supplied to the adder 35 as a signal D.

$$D = -(\overline{\phi 2'} \times r3/r4)$$

Accordingly, during the period T2, the signals B and D are added in the adder 5 and the target current of the motor 31 is abruptly reduced to zero as shown in FIG. 4.

In the present embodiment, during the period T1, the damping (deceleration) component of the signal A effectively functions on the signal B so that a current component in the deceleration direction which is essentially proportional to a thrust speed is added to the target current. Accordingly, the output signal φ1 of the rotary encoder 32 of FIG. 4 approaches to zero with gentle attenuation. Thus, the time required for the motor 31 to bring the type head to the center of the print position and stop it is shortened and the oscillation at damping is reduced.

The present invention is not limited to the illustrated embodiments so long as only the deceleration component is taken out of the switch 36 as the target current of the motor 31 during the period T1 as shown in FIG. 4. Accordingly, only the velocity damp signal C shown in FIG. 4 may be taken out as the target current of the motor 31.

In the above embodiment, the motor is damped when the motor is to be stopped at the target position. Accordingly, unnecessary oscillation of the motor when the motor is stopped is suppressed and the print quality is improved.

In the above embodiments, the carrier is moved by the motor, although the present invention is not limited thereto. The motor may be used as a type selection motor to select a desired type of the type head which may be a daisy wheel type head or a cup type head.

What is claimed is:

1. A printer including a print head, said printer comprising:
    a carrier for moving the print head to a desired print position;
    a motor for driving said carrier;
    first detection means for detecting a present position of said carrier;
    second detection means for detecting a velocity of said carrier;
    designation means for designating a target print position of the print head;
    position error processing means for comparing the target print position designated by said designation means with the present position of the carrier detected by said first detection means to calculate a position error;
    target velocity means for determining a target velocity of said carrier in accordance with the position error calculated by said position error processing means;
    velocity error calculation means for calculating a velocity error based on the target velocity of the carrier determined by said target velocity means and the velocity of the carrier detected by said second detection means;
    velocity error altering means for altering the velocity error calculated by the velocity error calculation means in accordance with the position error calculated by said position error processing means; and
    motor drive means for driving said motor in accordance with the velocity error altered by said velocity error altering means.

2. A printer including a type head having a plurality of type elements, said printer comprising:
    a motor for selecting a type element from among the plurality of type elements of said type head;
    first detection means for detecting a present type element position of said type head;
    second detection means for detecting a rotational speed of said type head;
    second detection means for detecting a rotational speed of said type head;
    designation means for designating a target type element position of the type head;
    position error processing means for comparing the target type element position designated by said designation means with the present type element position of the type head detected by said first detection means to calculate a position error;
    target velocity means for determining a target rotational speed of said type head in accordance with the position error calculated by said position error processing means;
    velocity error calculation means for calculating a velocity error based on the target rotational speed of the type head determined by said target velocity means and the rotational speed of the type head detected by said second detection means;
    velocity error altering means for altering the velocity error calculated by the velocity error calculation means in accordance with the position error calculated by said position error processing means; and
    motor drive means for driving said motor in accordance with the velocity error altered by said velocity error altering means.

* * * * *

UNITED STATES PATENT AND TRADEMARK OFFICE
CERTIFICATE OF CORRECTION

PATENT NO. : 4,689,528  
DATED : August 25, 1987  
INVENTOR(S) : YOUICHI WATANABE It is certified that error appears in the above-identified patent and that said Letters Patent is hereby corrected as shown below:

<u>AT [57] IN THE ABSTRACT</u>

Line 4,   "represent" should read --represents--.

<u>IN THE DRAWING FIGURES/SHEET 1 OF 4</u>

FIG. 1,   "PULSE GENERATER" should read --PULSE GENERATOR--.  
    FIG. 1,   "FIRST ADDER/SUB-TRACTER" should read --FIRST ADDER/SUB-TRACTOR--.  
    FIG. 1   "SECOND ADDER/SUB-TRACTER" should read --SECOND ADDER/SUB-TRACTOR--.

<u>COLUMN 1</u>

Line 31,   "ojbect" should read --object--.  
    Line 66,   "light emitting" should read --light-emitting--.  
    Line 68,   "light emitting" should read --light-emitting--.

<u>COLUMN 2</u>

Line 15,   "degress" should read --degrees--.  
    Line 29,   "plied," should read --plied--.  
    Line 66,   "by" should read --of--.

<u>COLUMN 5</u>

Line 47,   "$\phi 1$ and $\phi 2$," should read --$\overline{\phi 1}$ and $\overline{\phi 2}$,--

UNITED STATES PATENT AND TRADEMARK OFFICE
CERTIFICATE OF CORRECTION

PATENT NO.  :  4,689,528

DATED       :  August 25, 1987

INVENTOR(S) :  YOUICHI WATANABE

It is certified that error appears in the above-identified patent and that said Letters Patent is hereby corrected as shown below:

COLUMN 6

Line 12,  "$\overline{\phi 2}$" should read --$\phi 2$--.
    Line 20,  "of" should be deleted.
    Line 62,  "5" should read --35--.

COLUMN 8

Lines 21-22,  "second detection means for detecting a rotational speed of said type head;" (second occurrence) should be deleted.

Signed and Sealed this

Second Day of February, 1988

*Attest:*

DONALD J. QUIGG

*Attesting Officer*    *Commissioner of Patents and Trademarks*